Dec. 6, 1932.  M. PIER  1,890,439
DESTRUCTIVE HYDROGENATION OF CARBONACEOUS MATERIALS
Filed May 3, 1929
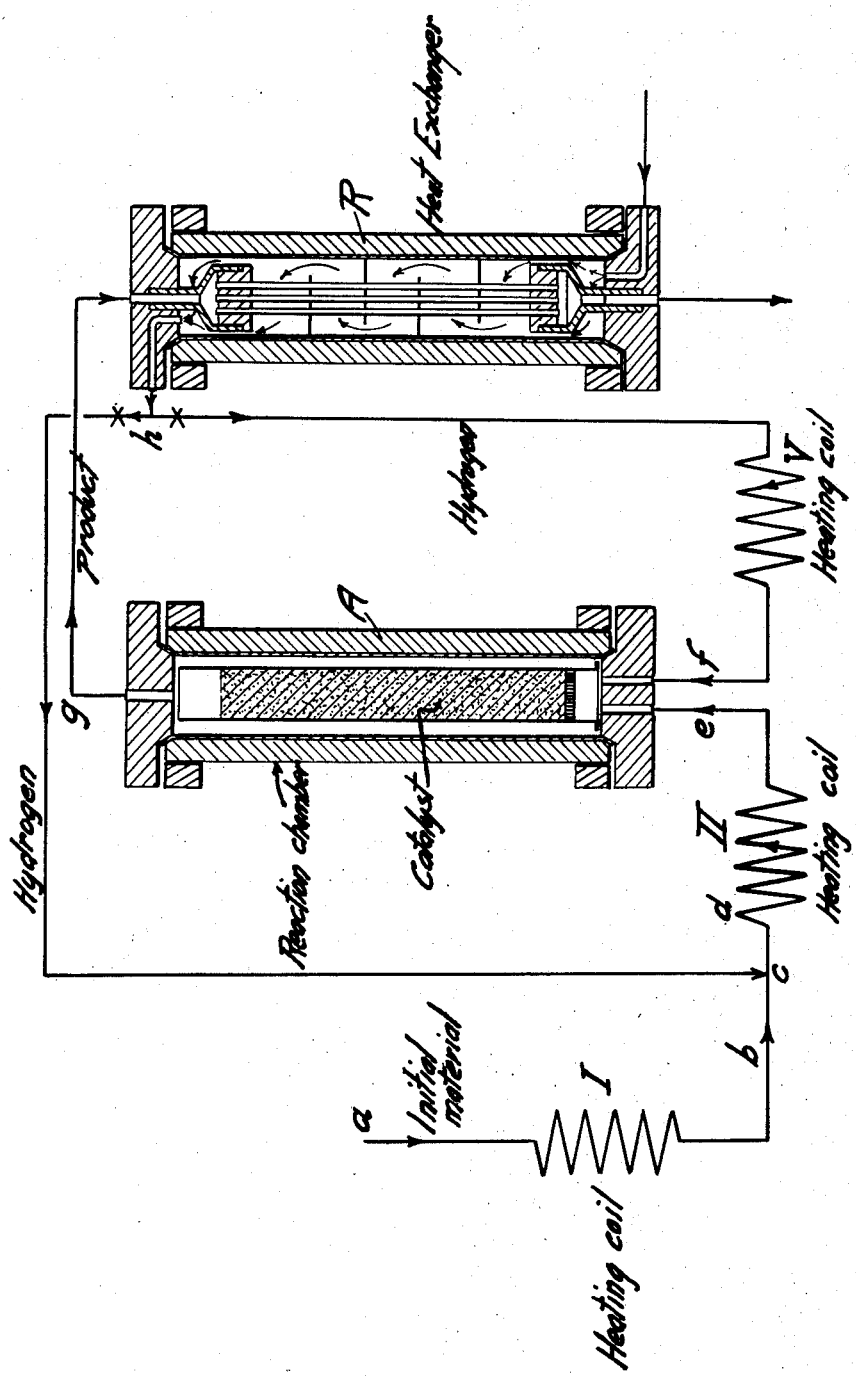
INVENTOR
MATHIAS PIER
BY
ATTORNEYS Patented Dec. 6, 1932

1,890,439

UNITED STATES PATENT OFFICE

MATHIAS PIER, OF HEIDELBERG, GERMANY, ASSIGNOR, BY MESNE ASSIGNMENTS, TO STANDARD-I. G. COMPANY, OF LINDEN, NEW JERSEY, A CORPORATION OF DELAWARE

DESTRUCTIVE HYDROGENATION OF CARBONACEOUS MATERIALS

Application filed May 3, 1929, Serial No. 360,194, and in Germany June 14, 1928.

This invention relates to an improved process for the production of valuable products from distillable carbonaceous materials, such as coal in all its varieties, tars, mineral oils, the distillation, conversion and extraction products thereof and the like.

In the conversion into more valuable products of distillable carbonaceous substances, such as coal in all its varieties, tars, mineral oils and the like, by treatment with reducing gases, such as hydrogen or gases containing hydrogen, under pressure, the said process being hereinafter referred to for the sake of brevity as "destructive hydrogenation" it has hitherto been the practice to supply the reducing gases and the substances under treatment separately with the heat required for the reaction. For example, the hydrogen was heated to a temperature above that needed for the reaction, and the carbonaceous initial materials were preheated to a temperature somewhat lower, for example, about 50° C. lower, than the reaction temperature. This method of supplying the heat entails admitting the substances under treatment and the reducing gases into the reaction chamber separately. Under these conditions, especially when treating substances containing solid constituents, such as coal and oil paste, or in the case of substances of high molecular weight, such as mineral oil residues and the like, which sometimes still contain solid constituents, the preheaters are very liable to become encrusted and obstructed by the deposition of coky substances or inorganic matter, such as lime and the like, particularly when the temperature rises a little too high.

I have now found that these troubles are obviated and in addition, further substantial advantages are secured, by separately preheating the carbonaceous materials to be treated and the hydrogenating gas only to a temperature substantially below the reaction temperature, then mixing the carbonaceous materials with at least part of the hydrogenating gas and supplying at least that amount of heat to the materials which is required to bring them from a temperature above 300° C., and more particularly above 350° C., to the reaction temperature while the carbonaceous matter and the hydrogen gas are mixed with each other, prior to introducing them into the reaction chamber. In the presence of the reducing gases, such as hydrogen, the initial materials may be heated to substantially higher temperatures without fear of incrustations and injurious depositions than in the absence of the said gases. Moreover, it has been found that, when operating in this manner, the heat balance of a reaction vessel can be improved, and the output of the vessel increased owing to the considerable reduction in the consumption of energy.

The process according to the present invention is advantageously carried out at pressures of 20, 50, 100 or 200 atmospheres or at even higher pressures, for example, at 1000 atmospheres. Operation at low pressures has the advantage that materials of lower solidity are required for the construction of the apparatus, whereas by operation at high pressures a considerably higher yield for a given space is attained and moreover the destructive hydrogenation is more intensive.

It is of advantage to operate by heating the sludge-like or liquid initial material with simultaneously introduced hydrogen to the reaction temperature in a coil which coil may be of ordinary or only slightly alloyed steel. Highly alloyed steels may of course also be employed with advantage. It is unnecessary to pass the whole of the hydrogen employed in the reaction through the coil, since the described effect is also obtained by the presence of smaller amounts of hydrogen. The preheated product is then conducted from the coil to the reaction chamber, where it is treated, either in the form of liquid or vapor, if required, with the admission of further hydrogen preheated to the reaction temperature and with or without catalysts.

As examples of catalysts particularly suitable for application in the process according to the present invention may be mentioned those immune from poisoning by sulphur, for example, catalysts comprising compounds containing sulphur in combination, for example metallic sulphides, in particular the heavy metal sulphides and more especially those of the iron group, either alone or as mixtures with one another or with metals, metalloids, active charcoal, coke or the like or with oxides, hydroxides, or carbonates, or with other materials of a catalytic or of inert nature. The sulphur may also be combined with the catalyst by adding sulphites or sulphates thereto or by the addition of sulphur to metals or oxides. A very suitable catalyst may be obtained by treating iron with hydrogen sulphide at an elevated temperature. Particularly suitable catalysts of this class are for example cobalt sulphide, iron sulphide, zinc sulphide, nickel sulphide, manganese sulphide and the like or mixtures thereof, for example, mixtures of cobalt sulphide with nickel sulphide or of cobalt sulphide with manganese sulphide, or of cobalt sulphide mixed with iron sulphide, or with zinc sulphide or with aluminium sulphide, with or without an addition of inert substances. Catalysts consisting of or containing molybdenum, chromium, tungsten, uranium or the compounds thereof or mixtures of those substances are also particularly suitable. As examples of this type of catalyst may be mentioned molybdic acid or ammonium molybdate, tungsten sulphide, tungstic acid, chromium hydroxide and chromic acid. Mixtures of chromium or tungsten with other catalysts such as with cobalt, nickel or iron may also be employed. Activation of the catalysts or the addition of substances increasing their mechanical strength may also be of advantage, this being effected for example with substances having a basic action such as potassium carbonate, aluminium hydroxide or calcium carbonate. Carriers such as lumps of aluminium silicate may also be employed with advantage. As further catalysts may be mentioned oxidic catalysts comprising zinc oxide, chromium oxide or manganese oxide or mixtures of these, if desired with an addition of a compound containing fixed nitrogen such as ammonium sulphide or such nitrides as are comparatively stable against the action of water, for example silicon nitride or titanium nitride. These said oxidic catalysts may be employed in conjunction with other substances such as lumps of fire-clay, quartz, asbestos, pumice, coke, active charcoal, metals, in particular heavy metals, metalloids, oxides, sulphides, carbides, and the like and mixtures thereof with the said substances. As still further examples of suitable catalysts may be mentioned such containing at least one of the elements silver, copper, cadmium, lead, bismuth, tin in the form of its compounds, further the difficultly reducible metal oxides or carbonates, such as magnesia, lithium carbonate, boric acid, alumina, the rare earths, including the difficultly reducible oxides of metals from the 4th group of the periodic system, or the oxides of zinc, manganese or vanadium. The catalysts may contain several of these substances or also other substances, for example metals from the 8th group of the periodic system, such as iron. As specific examples of these catalysts may be mentioned such obtained by impregnating porous refractory materials with a solution of lead nitrate, or of stannous chloride, silver nitrate or of copper hydroxide, either alone or in admixture with compounds of iron, cobalt and the like. Further may be mentioned catalysts containing the oxides of silver or of titanium, or lithium carbonate, magnesite, manganous oxide, silver borate or mixtures of copper oxide with cerous oxide or of silver with cobalt oxide and the like, and also porous refractory masses coated with vanadium oxide or thorium oxide or with a mixture of compounds of uranium and zinc or of silver and tungsten. These latter compounds may also be employed as such without application to the said porous materials. As further suitable catalysts may be mentioned catalysts containing active charcoal or the metalloids boron, silicon, phosphorus, arsenic, selenium, tellurium or the compounds thereof or halogens. These metalloids may advantageously be employed together with elements from the 2nd to the 8th group of the periodic system, in particular such selected from the 6th group of the periodic system. The catalysts may for example contain the following acids or their salts, namely phosphoric acid, arsenious acid, silicic acid, boric acid, hydrofluoric acid, hydrochloric acid, selenious acid and the like. As specific examples may be mentioned silicon carbide, alder-wood charcoal which has been glowed at 800° C. and impregnated with phosphoric acid, calcium phosphate, molybdenum phosphate, tungsten phosphate, iron phosphate, aluminium phosphate, arsenious acid together with molybdenum or tungsten, silicides, for example iron silicide containing 15 per cent of silicon, active silica, hydrosilicates, borides such as titanium boride or iron boride, calcium fluoride, molybdenum with 10 per cent of aluminium chloride, molybdenum with 10 per cent of cadmium chloride, molybdic acid with sodium selenite. Compounds containing fixed nitrogen may also be employed with advantage in the reaction. Thus ammonia or its salts, for example, ammonium sulphide and in some cases organic compounds of nitrogen may also be advantageous. Such nitrides as are fairly stable against the action of water have been found to give particularly good results. As further examples of suitable catalysts may be mentioned, such containing one or more elements from the a (4th to the 8th group of the periodic system, in particular such from the 6th group of the periodic system and more particularly molybdenum together with b) small amounts of other elements from the 2nd to the 7th group of the periodic system or copper or gold or the compounds thereof. The elements from the 2nd and 3rd group may however also be employed in large amounts. Thus mixtures containing molecular proportions of molybdic acid with magnesia or with copper or with aluminium hydroxide, or mixtures of tungstic acid with zinc oxide or of vanadium oxide with magnesia furnish good results. Excellent catalysts are further molybdic acid with about 10 per cent of chromium oxide or of vanadium oxide, molybdic acid with about 10 per cent of uranium oxide or of thorium oxide or of manganous oxide, further tungstic acid containing about 10 per cent of chromium oxide or of a mixture of uranium oxide, cobalt and a small amount of chromium oxide. Again another very suitable class of catalysts is formed by the noble metals or lead or tin or compounds thereof on carriers, in particular on magnesia or mangnesite or chromium oxide. As examples of this class of catalysts may be mentioned ruthenium, palladium, platinum, gold, lead or tin on magnesia or magnesite or platinum or gold on chromium oxide. Catalysts containing small amounts of silver or of mixtures of copper with zinc or with cadmium in a free state or in chemical combination and preferably also boron or aluminium or silicon or titanium, or vanadium, or tantalum or chromium or molybdenum or tungsten or cobalt in a free or combined state or mixtures of these are also very suitable. Examples of such catalysts are tantalic acid containing 10 per cent of silver, molybdic acid containing 10 per cent of silver or silica containing 10 per cent of a mixture of copper and zinc. Again another class of catalysts consists of refractory metals or alloys on which small amounts of solid oxides of elements having a catalytic action from the 3rd to the 7th group of the periodic system have been deposited. The said metals or their alloys are preferably employed in an etched condition and preferably acidified solutions of salts of the said oxides are employed as the etching agent.

It is also advisable to remove the liquid or sludge-like product from the reaction chamber and to return it thereto, either periodically or continuously and preferably in circulation, and to bring it to the temperature necessary for the reaction, by warming or cooling, in presence of reducing gases, outside the reaction chamber. In such case, the reducing gases may be introduced from outside the reaction chamber, or may be drawn from the reaction chamber or both. At the same time this method of working brings about in efficient stirring and intermixing of the liquid and gas.

It is advantageous to operate by jointly preheating the reducing gases, such as hydrogen and the carbonaceous materials to be treated, in a regenerating plant, by means of the effluent hot constituents of the reaction, and then to pass the treated materials into the reaction chamber. In many cases the heat generated in the destructive hydrogenation process is sufficient to raise the reaction materials to the necessary temperature. In certain circumstances it is also possible to operate without any further supply of heat, and in some cases it is even possible to recover energy. Moreover, the joint preheating and feeding of the substances taking part in the reaction enables the apparatus and attendance needed therefor to be simplified.

The present invention has also the particular advantage that the structural material of the apparatus suffers substantially no corrosion. In operating in accordance with this invention there is no longer any need to construct all the parts of the apparatus which come into contact with the hot reacting materials, of expensive material such as highly alloyed steels or other similar alloys, or to make them of other chemically resistant substances such as aluminum and the like; but it is sufficient if only such parts of the apparatus as come into contact with vaporous or gaseous reacting substances at high temperature are constructed of, or coated with the said materials. The other parts, especially those coming into contact with the liquid reacting substances, are preferably constructed of ordinary or slightly alloyed steel unless a high sulphur content on the part of the reacting substances entails the provision of other linings, such as of aluminium or the like. When initial materials of relatively low boiling point such as middle oils, freed from high-boiling constituents, are treated, in the gaseous state, the apparatus, for example coils, used for preheating, may also be constructed of less high-grade material, if the apparatus be disposed inside the reaction chamber, thereby effecting a balancing of pressure. If desired, the coils may be heated, for example, by electricity.

A jacketed vessel may be employed for the reaction chamber, and fluid media for example, gases such as nitrogen, or liquid of low conductivity such as naphthalene may be circulated under pressure in the jacket space. In this case, the heat is preferably supplied, indirectly through the said media, which are employed in a state of flow. Good heat conductors, such as molten lead, and the like, which are impermeable to hydrogen under the conditions of the reaction, may also be employed as media, direct heating being preferably supplied in these cases. In certain circumstances it may be advantageous to employ a solid lining of aluminium or special steels or the like. For example, a vessel of chemically resistant material may be used closely surrounded by an outer shell which takes up the pressure and this may be provided with vents. In this manner the difference of pressure on the inner vessel is reduced and it may therefore be made of weaker material.

I will further illustrate the invention by way of example with reference to the accompanying diagram.

Brown coal (lignite) is stirred to a pulp with a high boiling oil—obtained by the pressure hydrogenation of coal and containing about 25 per cent of constituents boiling up to 350° centigrade—and the mixture is forced, by means of a pump, into a Siemens-Martin steel coil I at a. The sludge issues from the coil at b, at a temperature of about 320° C. A part of the hydrogenating gas, about 30 per cent of which is preheated in the heat exchanger R by the product issuing from the reaction chamber A, is drawn off at h and is introduced into the coal pulp at c. The coal pulp and gas flow simultaneously at d, into the coil II, which is constructed of slightly alloyed steel, and enter the reaction chamber at e at a temperature of about 430° C. After being preheated to about 430° C. in the heat exchanger V, the remainder of the hydrogenating gas coming from the generator R is distributed into the reaction chamber through a porous plate at f. The wall of the reaction chamber which bears the pressure is of ordinary steel with a lining of V2A steel. The process is carried out in the presence of a catalyst consisting of molybdic acid and zinc oxide in molecular proportions. The catalyst is either added to the initial pulp in a very finely dispersed form so that it remains suspended in the pulp during the reaction or it is rigidly arranged in the reaction vessel A so that the treated materials come into contact with the catalyst when they pass through said reaction vessel.

Since the destructive hydrogenation process is an exothermic reaction, the temperature of 430° to 450° C. necessary for carrying out the reaction is generated by the reaction itself, and therefore no separate supply of heat to the reaction vessel is necessary. The reaction products are drawn off at g to the heat exchanger R. The oils and the like may also be preheated in heat exchangers.

What I claim is:

1. In the destructive hydrogenation of a distillable bituminous material in the presence of a gas comprising free hydrogen under a pressure of at least 20 atmospheres and a temperature within that portion of the range usually employed for destructive hydrogenation which is substantially above 350° C., said bituminous material containing constituents decomposable between 300° C. and the reaction temperature, the step of separately preheating the bituminous material and the hydrogenating gas to a temperature between 300 and 350° C., then mixing the bituminous material with at least part of the hydrogenating gas and supplying at least that amount of heat to the materials which is required to bring them from said temperature to the reaction temperature prior to introducing them into the reaction chamber.

2. In the destructive hydrogenation of a distillable bituminous material in the presence of a gas comprising free hydrogen under a pressure of at least 20 atmospheres and a temperature within that portion of the range usually employed for destructive hydrogenation which is substantially above 350° C., said bituminous material containing constituents decomposable between 300° C. and the reaction temperature, the step of separately preheating the bituminous material and the hydrogenating gas to a temperature between 300 and 350° C., then mixing the bituminous material with at least part of the hydrogenating gas, supplying at least that amount of heat to the materials which is required to bring them from said temperature to the reaction temperature prior to introducing them into the reaction chamber, removing the liquid product obtained in the reaction from the reaction chamber, bringing it to the temperature necessary for the reaction outside the reaction chamber in the presence of reducing gas, and thereupon returning the product thereto.

3. In the destructive hydrogenation of a distillable bituminous material in the presence of a gas comprising free hydrogen under a pressure of at least 20 atmospheres and a temperature within that portion of the range usually employed for destructive hydrogenation which is substantially above 350° C., said bituminous material containing constituents decomposable between 300° C. and the reaction temperature, the step of separately preheating the bituminous material and the hydrogenating gas to a temperature between 300 and 350° C., then mixing the bituminous material with at least part of the hydrogenating gas supplying at least that amount of heat to the materials which is required to bring them from said temperature to the reaction temperature prior to introducing them into the reaction chamber, and allowing the gaseous reacting substances while at high temperatures to come into contact only with such surfaces of the apparatus as consist of a chemically resistant highly alloyed steel.

4. In the destructive hydrogenation of lignite under a pressure of at least 20 atmospheres and in the presence of a gas comprising added free hydrogen, the step of stirring up the material to a pulp with a high-boiling oil, forcing the mixture through a passage thereby heating it to a temperature of about 320° C., introducing the material thus preheated together with preheated hydrogen into a further heated passage thereby bringing it to a temperature of about 430° C., and introducing the material and also further amounts of hydrogen into a space in which hydrogenation is allowed to proceed.

In testimony whereof I have hereunto set my hand.

MATHIAS PIER.